United States Patent [19]

Tama et al.

[11] 4,196,449
[45] Apr. 1, 1980

[54] DIGITAL VIDEO EFFECTS SYSTEM EMPLOYING A CHROMA-KEY TRACKING TECHNIQUE

[75] Inventors: Tomoo Tama; Masao Inaba; Kazuo Kashigi, all of Tokyo, Japan

[73] Assignee: Nippon Electric Co., Ltd., Tokyo, Japan

[21] Appl. No.: 971,516

[22] Filed: Dec. 20, 1978

[30] Foreign Application Priority Data

Dec. 28, 1977 [JP] Japan .................. 52-159009

[51] Int. Cl.² ............................................. H04N 5/22
[52] U.S. Cl. ........................................ 358/183; 358/22; 358/185
[58] Field of Search .................. 358/22, 183, 185

[56] References Cited

U.S. PATENT DOCUMENTS

| | | | |
|---|---|---|---|
| 3,515,802 | 6/1970 | Wise | 358/22 |
| 3,832,485 | 8/1974 | Pieters | 358/183 |
| 4,007,487 | 2/1977 | Vlahos | 358/183 |
| 4,092,673 | 5/1978 | Adams | 358/185 |

*Primary Examiner*—Richard Murray
*Attorney, Agent, or Firm*—Hopgood, Calimafde, Kalil, Blaustein & Lieberman

[57] ABSTRACT

A chroma-key insertion technique by which a part of a second television picture, designated by a chroma-key signal produced from a first television picture, is inserted into the first television picture. The second television picture is displayed on a television monitor which is inserted into the chroma-key frame advantageously allowing a television announcer to always face or direct his eyes toward the chroma-key screen in which a picture from a remote video source is to be inserted on a resultant picture.

5 Claims, 12 Drawing Figures

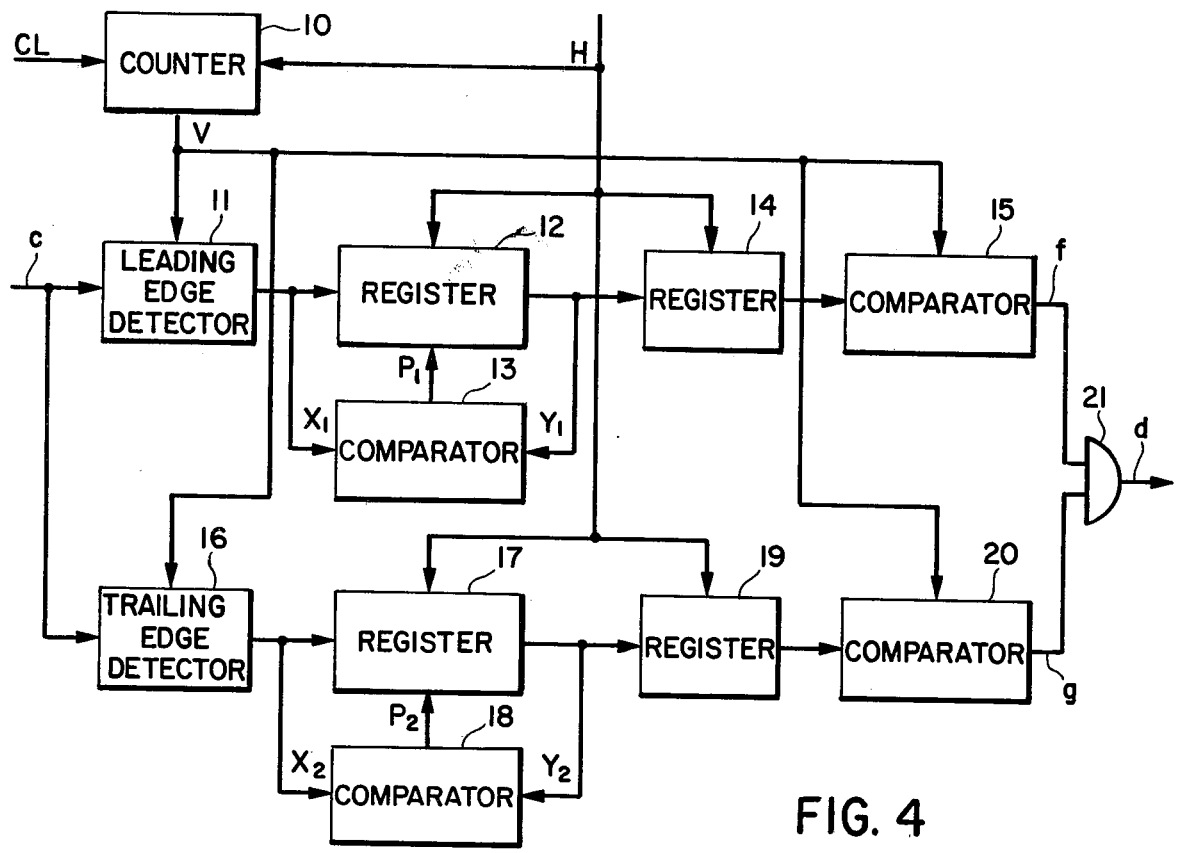

DIGITAL VIDEO EFFECTS SYSTEM EMPLOYING A CHROMA-KEY TRACKING TECHNIQUE

FIELD OF THE INVENTION

This invention relates to digital video effects systems, and more particularly to a chroma-key tracking system for inserting a television picture into an area on another television picture, specified by a chroma-key frame.

DESCRIPTION OF THE PRIOR ART

The so-called keyed insertion technique, by which a part of one television picture, is inserted into another television picture, to produce special effects is frequently used in television broadcasting. One example of such a technique is the chroma-key insertion technique by which a part of a second picture is designated by a chroma-key signal, produced from a first picture, and the designated part of the second picture is inserted into the first picture. Certain chroma-key tracking systems are disclosed in U.S. patent application Ser. Nos. 922,634 and 933,815, assigned to the same assignee as the instant application.

According to a conventional chroma-key tracking system, there are provided, at a television studio, a blue-colored chroma-key screen, a studio camera for picking up an image of an announcer together with the chroma-key screen, and a floor monitor. The studio camera produces a first video signal representing a first picture composed of the announcer and the chroma-key screen provided at the television studio.

The floor monitor is supplied with a second video signal from another video source such as a van or a remote television station and the second video signal is displayed on the monitor for reference by the announcer.

The second video signal is also supplied to video processing apparatus designed to insert the second picture into an area on a first picture specified by the chroma-key screen. The first picture represents the first video signal and the insertion of the second picture into the first picture produces the desired special effects. The first video signal and the second inserted video signal are transmitted from the broadcasting station to remote receivers.

The second video picture can be inserted into the chroma-key screen area in the first picture on remote television receivers. Therefore, the inserted second picture is not displayed on the chroma-key screen but is displayed on the floor monitor at the television studio. In the case where the announcer at the studio talks with a reporter at a van, while viewing the second picture displayed on the floor monitor positioned in a different position than the chroma-key screen, the announcer must direct his eyes or his face toward the chroma-key screen after looking or glancing at the monitor screen and advantageously behaves as if he were actually talking with the remote reporter face to face. As the content of the second picture changes, the announcer must frequently move his eyes from the monitor to the chroma-key screen or vice versa. Therefore, the announcer cannot always direct his eyes toward the reporter in the second picture and it no longer appears as if the reporter and the announcer were speaking in a face-to-face arrangement.

It is therefore an object of this invention to provide a chroma-key tracking system, wherein the announcer can always advantageously face or direct his eyes toward the chroma-key screen in which a picture from a remote video source is to be inserted on a resultant picture.

SUMMARY OF THE INVENTION

In accordance with a first aspect of the invention a tracking system is provided for producing special effects on a television picture. The special effects include the insertion of a second picture, relating to a second video signal, into a key frame positioned on a first picture, said first picture relating to a first video signal.

It is a feature of the invention that apparatus picks up an image which includes the key frame to produce the first video signal.

It is another feature of the invention that the second picture is monitored by apparatus installed in the key frame, the monitoring apparatus being responsive to the second video signal.

In accordance with another aspect of the invention, a key signal is produced in response to the first video signal, the key signal including first and second signal portions corresponding to the key frame and the monitoring apparatus respectively.

It is a further feature of the invention that a compensated key signal is produced by converting the second signal portion into a signal component which is the same as that of the first signal portion, the compensated key signal being used to selectively gate the first and second video signals in order to insert the second picture into the chroma-key frame in the first picture.

The features, objects and advantages of this invention will be understood from the detailed description of a preferred embodiment thereof, taken in conjunction with the accompanying drawings.

BRIEF DESCRIPTION OF THE DRAWINGS

FIG. 4 is a block diagram of a key-signal compensator used in the embodiment shown in FIG. 2; and FIGS. 5A to 5D are waveform diagrams of signals appearing at various parts of the embodiment of FIG. 4.

DETAILED DESCRIPTION

Figure 1:
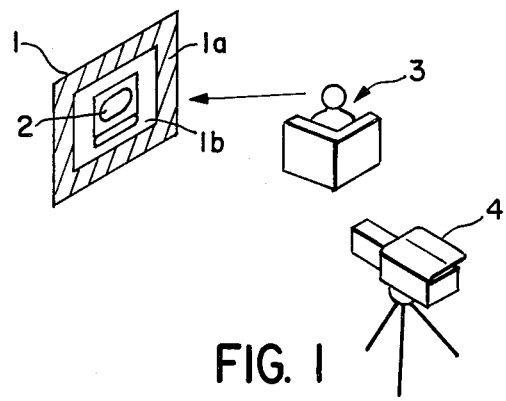
FIG. 1 shows an equipment arrangement at a television studio in which an embodiment of this invention is installed.

Refer to FIG. 1 which illustrates a television studio in which an embodiment of this invention is installed. FIG. 1 includes a chroma-key frame 1, having a peripheral portion 1a, colored in blue, and a penetrated center portion 1b. Floor monitor 2 is installed in the center portion 1b, and studio camera 4 picks up the various images, including the chroma-key frame 1 and an announcer 3 to produce a first video signal a, shown in FIG. 2. A second video signal b (FIG. 2) from the van or a remote television station (not shown) is supplied to the floor monitor 2 to display a second picture relating to the second video signal b. Due to the advantageous arrangement of the floor monitor, announcer 3 can communicate with the audience with his face directed toward floor monitor 2 and chroma-key frame 1.

Figure 2:
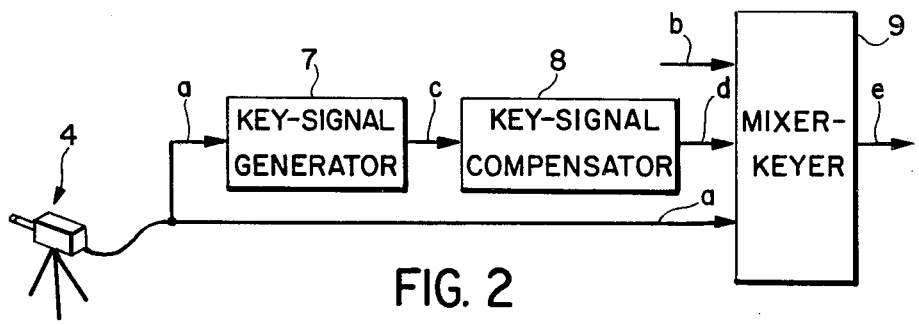
FIG. 2 is a block diagram of one embodiment of this invention.
Figure 3A:
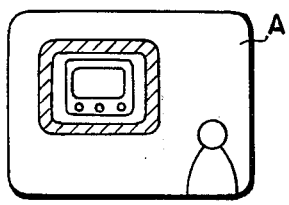
FIGS. 3A to 3E show television pictures illustrating the principle of the instant invention.
Figure 3C:
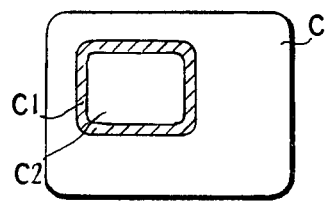
Figure 3D:
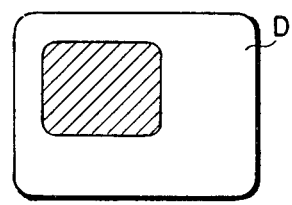

Referring to FIG. 2, the first video signal a, representing a first picture A as shown in FIG. 3A is supplied to a chroma-key signal generator 7. The chroma-key signal generator 7 produces a key signal c which represents a picture C as shown in FIG. 3C. The key signal c includes first and second signal portions c1 and c2 (FIG. 3C). corresponding to the hatched portion C1 and the surrounded portion C2 which also represent the peripheral portion 1a and the center portion 1b of the chroma-key frame 1, respectively. The key signal c is supplied to a key-signal compensator 8 which converts the second signal portion c2 into a signal component which is the same as that of the first signal portion c1, thereby providing a compensated key-signal d, representing a picture D, as shown in FIG. 3D.

On example of key-signal compensator 8 is illustrated in FIG. 4. In key-signal compensator 8, a counter 10, driven by clock pulses CL to advance one state per clock pulse, is cleared to zero by a horizontal synchronizing pulse H. Counter 10 applies it's stored counts to a leading-edge detector 11 and a trailing-edge detector 16, both of which are supplied with key signal c. The leading-edge detector 11 detects the counted value stored in counter 10 at the leading edge of key-signal c. This leading edge count is applied to register 12 and to comparator 13 as a value $X_1$. Register 12 is reset to a predetermined maximum value at the tailing edge of the horizontal synchronizing pulse H, once every horizontal scanning period. Comparator 13 compares the counted value $X_1$ with a value $Y_1$ stored in register 12 and generates a pulse $P_1$ when $X_1 < Y_1$. Pulse $P_1$ is supplied to register 12 and in response thereto, the value $X_1$ is stored in register 12 as a new value $Y_1$. The value $Y_1$ is transferred to and stored in register 14 at the leading edge of the horizontal synchronizing pulse H once every horizontal scanning period. The stored value $Y_1$ in register 14 represents the leftmost portion of the key signal c.

The trailing-edge detector 16 detects the counted value stored in counter 10 at every trailing edge of key signal c and applies the stored count to register 17 and to comparator 18 as a value $X_2$. Register 17 is reset to zero at the trailing edge of the horizontal synchronizing pulse H once every horizontal scanning period. Comparator 18 compares the counted value $X_2$ with the value $Y_2$ stored in register 17 and generates a pulse $P_2$ when $X_2 > Y_2$. The pulse $P_2$ is supplied to the register 17 and in response thereto the value $X_2$ is stored in register 17 as a new value $Y_2$. The last value $Y_2$, stored in each horizontal scanning period, is transferred to and stored in register 19 at the leading edge of the horizontal synchronizing pulse H once every horizontal scanning period. The stored value $Y_2$ in register 19 represents the rightmost position of the key signal c.

The values $Y_1$ and $Y_2$ stored in registers 14 and 19 are supplied to comparators 15 and 20, respectively, which are in turn supplied with the count V stored in counter 10. Comparator 15 compares the value $Y_1$ held in register 14 with the counted value V of the counter 10 and generates a signal f (logic "1") when the value $Y_1$ is less than the counted value V of the counter 10, i.e., $Y_1 \leq V$. Comparator 20 compares the value $Y_2$ stored in register 19 with the count V and generates a signal g (logic "1") when the value $Y_2$ is greater than the counted value V, i.e., $Y_2 \geq V$. Assuming that the key signal is as shown in FIG. 5A, the signals f and g are as shown in FIGS. 5B and 5C.

The signals f and g are supplied to AND gate 21 to produce the compensated key-signal d as shown in FIG. 5D.

Figure 3B:
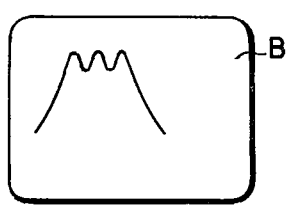
Figure 3E:
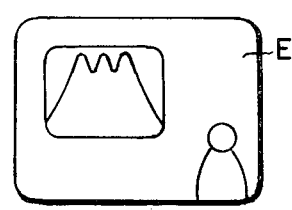

Referring again to FIG. 2, the compensated key-signal d is supplied to a mixer-keyer 9, which is supplied with the first video signal a and a second signal b representing a picture B shown in FIG. 3B. In this manner, the second video signal b is inserted into and keyed with the first video signal to give the required output signal e representing a picture E as shown in FIG. 3E.

Although a specific embodiment of this invention has been shown and described, it will be understood that various modifications may be made without departing from the spirit of this invention.

What is claimed is:

1. A tracking system for producing special effects on a television picture, the special effects including inserting a second picture, relating to a second video signal, into a key frame positioned on a first picture, relating to a first video signal, said system comprising:
    means for generating said first video signal, said first video signal representing an image which includes said key frame,
    means installed in said key frame and responsive to said second video signal for displaying said second picture;
    means responsive to said first video signal for producing a key signal, said key signal including first and second signal portions corresponding to said key frame and said displaying means, respectively;
    means responsive to said key signal for converting said second signal portion into a signal component which is the same as that of said first signal portion and for producing a compensated key-signal; and
    means for selectively gating said first video signal and said second video signal in response to said compensated key signal whereby said second picture is inserted into said key frame in said first picture.

2. A tracking system in accordance with claim 1 wherein said converting means includes means responsive to a leading edge of said key signal for storing a generated signal indicative of a left-most position of said key signal and responsive to a trailing edge of said key signal for storing a generated signal indicative of a right-most position of said key signal.

3. A tracking system in accordance with claim 2 wherein there is further included means for comparing said left-most generated signal and said right-most generated signal with a count signal and for producing said compensated key-signal in response to predetermined relationships in value between said count signal and said left-most and right-most generated signals.

4. A tracking system for inserting a second television picture, relating to a second video signal, into a key frame positioned on a first television picture relating to a first video signal, said first video signal representing a video image which includes said key frame, said system comprising:
    means inserted within said key frame for displaying said second television picture,
    means responsive to said first video signal for producing a key signal, said key signal including first and second signal portions representing said key frame and said displaying means respectively,
    means responsive to said first and second portions of said key signal for producing a compensated key-signal, and
    means responsive to said compensated key signal for inserting said second television picture into said key frame in said first television picture.

5. A tracking system in accordance with claims 4 wherein said compensated key signal producing means includes means for converting said second signal portion into a signal component which is the same as that of said first signal portion.

* * * * *